June 20, 1967
E. R. MONTNEY ET AL
3,325,983
GRASS CLIPPER AND EDGER
Filed Nov. 27, 1964
2 Sheets-Sheet 2
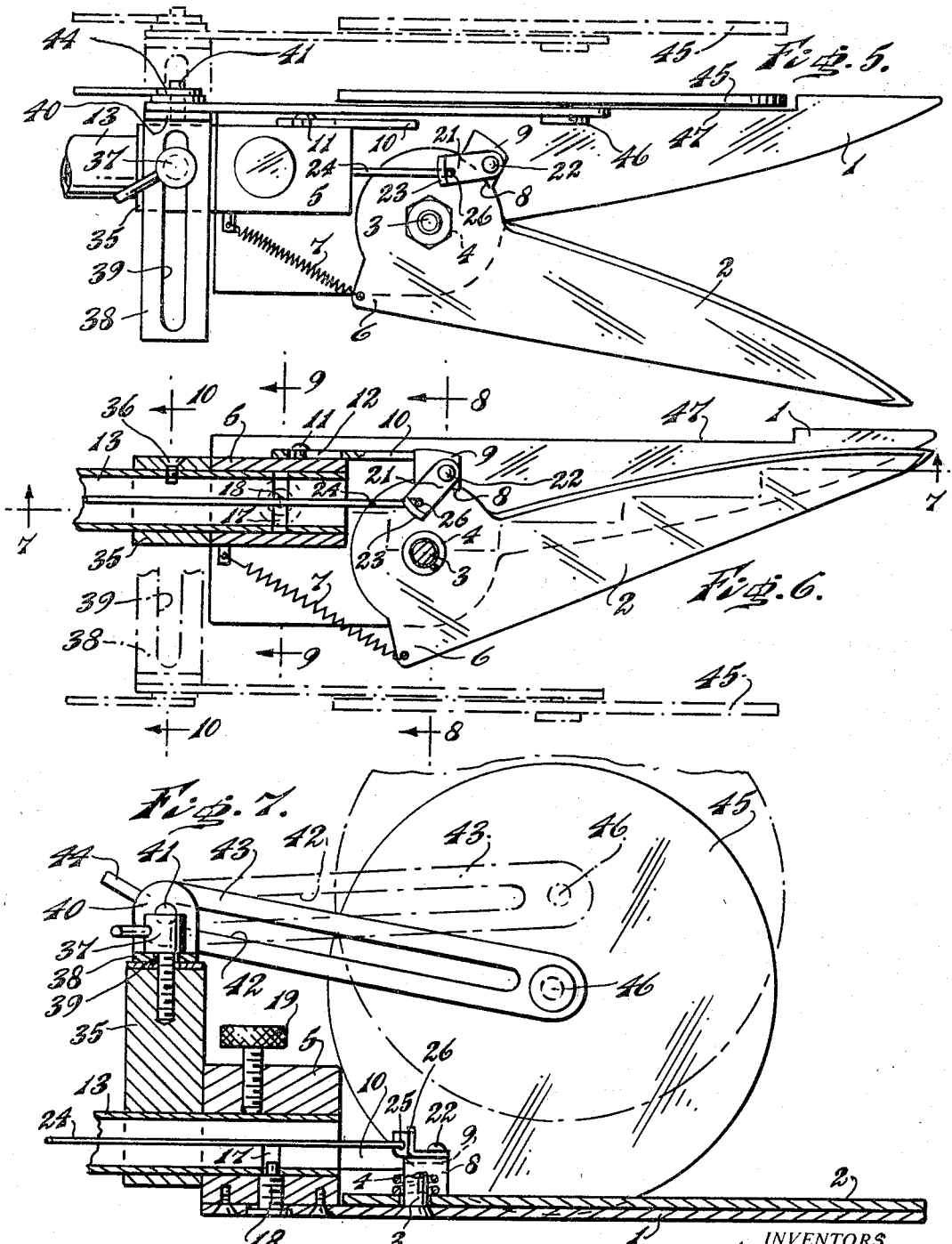
INVENTORS
Earl R. Montney
Nolan Montney
BY
ATTORNEY United States Patent Office 3,325,983
Patented June 20, 1967

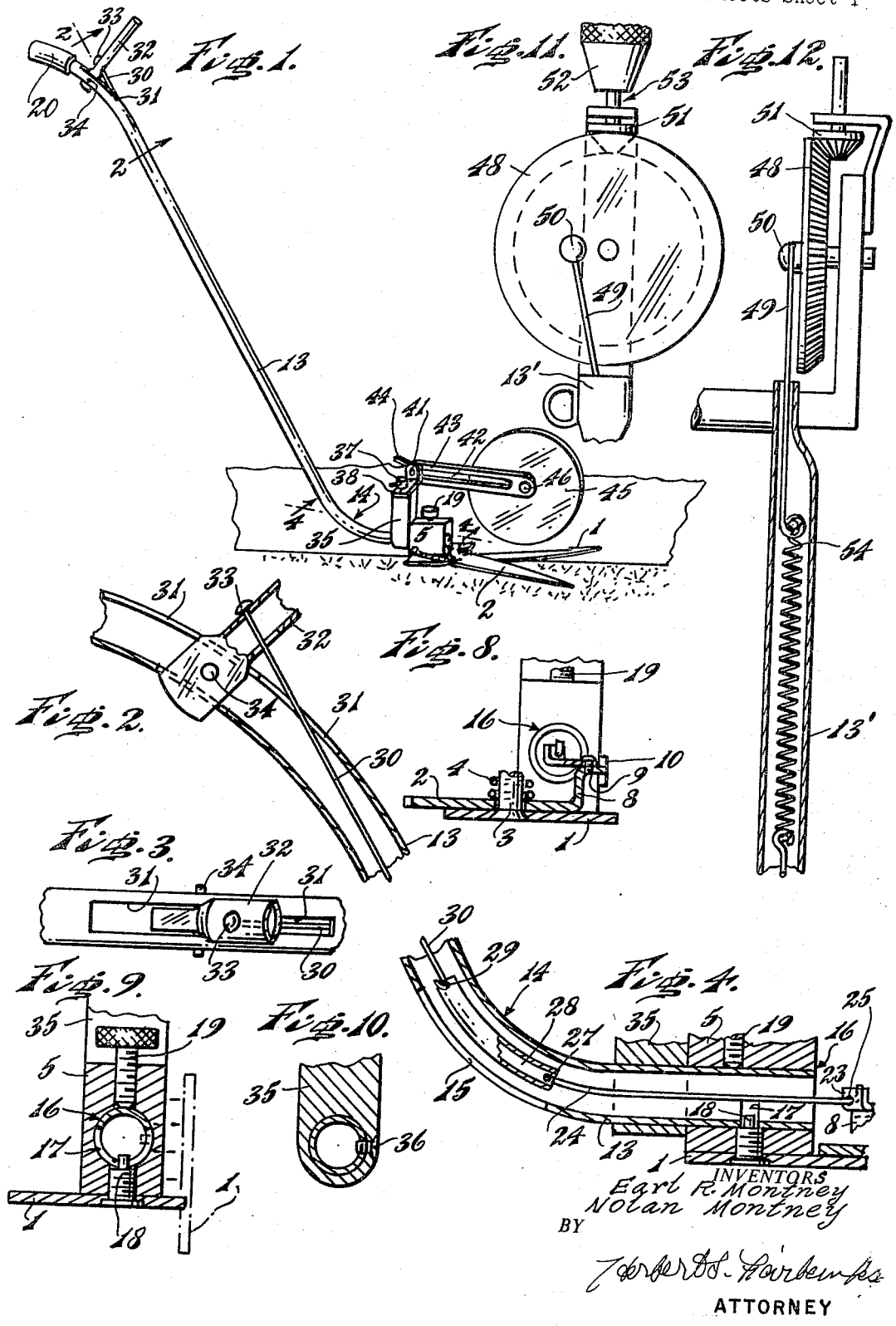

3,325,983
GRASS CLIPPER AND EDGER
Earl R. Montney, 2545 Eastcliff Drive, Columbus, Ohio 43221, and Nolan Montney, 2608 Grafton Drive, Cornwells Heights, Pa. 19020
Filed Nov. 27, 1964, Ser. No. 414,172
1 Claim. (Cl. 56—241)

Our invention relates to a type of grass trimmer in which the handle is elongated to provide for moving the trimmer along the line of cut, while the operator is in a standing position and means are carried by the upper end of the handle for moving a movable blade towards a stationary blade, the movable blade being normally retained in its open position by means of a spring.

One object of the invention is to devise a novel grass trimmer having a blade assembly comprising a fixed and a movable blade, pivotally connected, with the blade assembly rotatably mounted at the lower end of a handle, to position it for an angular cut at one side or the other of the longitudinal axis of the trimmer, with means for locking the blade assembly in its selected angular position.

A further object of the invention is to devise a novel construction of a handle, having its lower end curved forwardly with means extending through the handle having a linkage at the curved portion of the handle, and having at its upper end actuating means in the form of a lever, through which a rod passes, the upper free end of the rod being headed, so that the lever contacts the headed portion to actuate the movable blade.

It further comprehends a novel construction and arrangement for mounting an edger, so that it can be adjusted for a desired depth of cutting at one side or the other of the blade assembly.

A further object is to provide a motor supported by the handle for actuating the movable blade.

With the foregoing and other objects as will hereinafter appear in the detailed description and the appended claim, our invention comprehends a novel construction and arrangement of the component parts of a grass trimmer and edger.

For the purpose of illustrating the invention, we have shown in the accompanying drawings preferred embodiments of it which we have found in practice to give satisfactory and reliable results. It is, however, to be understood that the various instrumentalities of which the invention consists can be variously arranged and organized, that the invention is not limited, except by the scope of the appended claim, to the exact arrangement and organization of these instrumentalities as herein set forth.

FIGURE 1 is a perspective view of a grass trimmer and edger embodying our invention.

FIGURE 2 is a fragmentary section on an enlarged scale of the actuating means of the movable blade, the section being taken on line 2—2 of FIGURE 1.

FIGURE 3 is a fragmentary top plan view, partly broken away, of the construction seen in FIGURE 2.

FIGURE 4 is a fragmentary section on an enlarged scale, of the lower part of the handle, the section being taken on line 4—4 of FIGURE 1.

FIGURE 5 is a top plan view of the blade assembly, the blades being shown in open position.

FIGURE 6 is a top plan view, similar to FIGURE 5, but showing the blades in closed position and having part of the assembly broken away.

FIGURE 7 is a longitudinal jump section on the line 7—7 of FIGURE 6.

FIGURE 8 is a transverse section taken on line 8—8 of FIGURE 6.

FIGURE 9 is a transverse section taken on line 9—9 of FIGURE 6.

FIGURE 10 is a transverse section taken on line 10—10 of FIGURE 6.

FIGURE 11 is an elevation, partly broken away, of another embodiment of the invention.

FIGURE 12 is a side elevation, partly broken away, of the embodiment seen in FIGURE 11.

Similar numerals of reference indicate corresponding parts.

Referring to the drawings:

*The blade assembly*

The trimmer has a relatively stationary blade 1, on which is mounted a movable blade 2, by a pivot 3, having a tension spring 4, tending to maintain a tension on the blades. The blade 1 is extended rearwardly beyond its pivot and has secured to it in any desired manner, a handle connecting block 5. The movable blade 2 also has an extension 6, extending rearwardly and adapted to receive a spring 7, connected to block 5 and tending to keep the movable blade in an open position. The movable blade 2 has a raised portion 8 opposite the extension 6, and having an outwardly extending portion 9 adapted to butt against an adjustable stop 10, mounted on block 5 by means of screw 11, and having a slot 12.

*Handle connection with blade assembly*

A tubular handle 13, at its lower end curves forwardly as at 14 and is provided with a slot 15, opening through its bottom curved portion, to provide access to a curved link, later to be described. The lower end of the handle is fitted into a hole 16 in block 5, and is provided with a slot 17 having a retaining pin 18 threaded into the bottom of block 5, the slot 17 being adapted to permit the partial rotation of the blade assembly at any desired angle of the longitudinal axis of the handle. The blade assembly is retained at the desired angle by set screw 19, threaded into the top of block 5. The upper end of the handle 13 is curved outwardly to form a grasping handle 20.

*Control mechanism for the movable blade*

The outwardly extending portion 9 of the raised portion 8 of the movable blade 2 is adapted to receive in pivotal relation a link 21, pivoted at 22 to portion 9. The opposite end of link 21 is provided with an upturned end 23 adapted to receive a wire 24, through a hole 25. The wire 24 is retained in link 21 by an upturned portion 26. The wire 24 passes through the lower part of the tubular handle 13 to the point where the handle starts to curve, at which point it terminates in a hooked end adapted to be received at 27 in a curved tubular link 28, said link terminating at the end of the lower curve of the handle 13, and adapted to receive at 29 the hooked end of a second wire 30, passing upwardly within the tubular handle 13, passing through a slotted opening 31 in the upper curved portion of the tubular handle, and passing through an aperture in an actuating handle 32 and being retained therein at 33 in any suitable manner, such as by a nut or by heading the end of the wire. The handle 32 is pivoted at 34 to the curved portion of handle 13, and is adapted to be received in slotted opening 31. The lower end of handle 32 also passes through a slot in the bottom of the bottom of the tubular handle 13, to provide the necessary clearance.

*The edger*

The lower part of the tubular handle 13 is provided with a mounting block 35 and fixed thereto by fastening means 36 and abutting the rearward end of block 5. The upper end of block 35 is provided with a locking means 37 in threaded engagement with said block, and adapted to lock against a mounting arm 38, said arm 38 being provided with a longitudinal adjusting slot 39. One end of arm 38 is provided with an upturned portion 40 which receives a threaded stud 41, said stud 41 being received in a longitudinally extending slot 42 in an arm 43. The arm 43 is retained on the stud 41 in any desired vertical angle by locking means 44. The opposite end of arm 43 mounts a disc 45 in pivotal engagement with the arm as at 46. In some cases it may be desirable to mount the edger in line with the edge of the fixed blade, as best seen in FIGURE 5. A cutout 47 is provided in the fixed blade for this purpose.

Power drive

In FIGURES 11 and 12 we have shown how a power drive may be substituted for a manual drive.

The upper end of the tubular handle 13' has mounted on it a bevel gear 48, having a wire 49 mounted eccentrically thereon at 50 to provide a reciprocating motion, the bevel gear 48 being provided with a pinion 51, having the chuck of an electric motor 52, detachably connected with the pinion 51 as at 53.

It is to be noted that the clipper is balanced and glides along on the wheel at all times at any angle or depth of cut, and by setting the wheel close to the stationary blade, as in FIGURE 5 of the drawings, it guides the point close to any object, such as trimming along a wire fence, a wall, tree, etc.

In the operation of FIGURES 1 to 10, when the operating lever is raised, it affects the closing movement of the movable blade.

In the power driven type a coil spring 54 may be employed, as best seen in FIGURE 11, which provides shock absorbing action in the event of an obstruction in the blades sufficient to cause the blades to jam.

Having thus described our invention, what we claim as new and desire to secure by Letters Patent is:

In a grass trimmer and edger, a blade assembly having a fixed and a movable blade and provided with a mounting block, a handle having its lower end curved forwardly, said mounting block rotatably mounted on the lower end of said handle, means to lock the block in adjusted position on said handle for grass cutting or edging, means carried at the upper end of the handle operatively connecting with said movable blade to actuate it, and an edger comprising a support fixedly connected with said handle, a mounting arm transversely movable on said support and having a threaded stud, means to lock the arm on said support, a second arm having a longitudinal slot to receive said stud and longitudinally adjustable on said first arm and a disc rotatably mounted in one end of said second arm.

References Cited

UNITED STATES PATENTS

| | | | |
|---|---|---|---|
| 1,869,295 | 7/1932 | Atterbury | 56—241 X |
| 2,323,188 | 6/1943 | Atkinson. | |
| 2,335,510 | 11/1943 | Hansen | 56—25 |
| 2,777,196 | 1/1957 | Zoetemelk. | |
| 2,957,297 | 10/1960 | Zoetemelk | 30—248 X |

ABRAHAM G. STONE, *Primary Examiner.*

P. A. RAZZANO, *Assistant Examiner.*